Jan. 14, 1958
E. KASS
2,820,108
HYBRID SYSTEM FOR USE IN RADIO-TELEPHONE LINKS COMPRISING A MONITORING CIRCUIT
Filed June 7, 1954
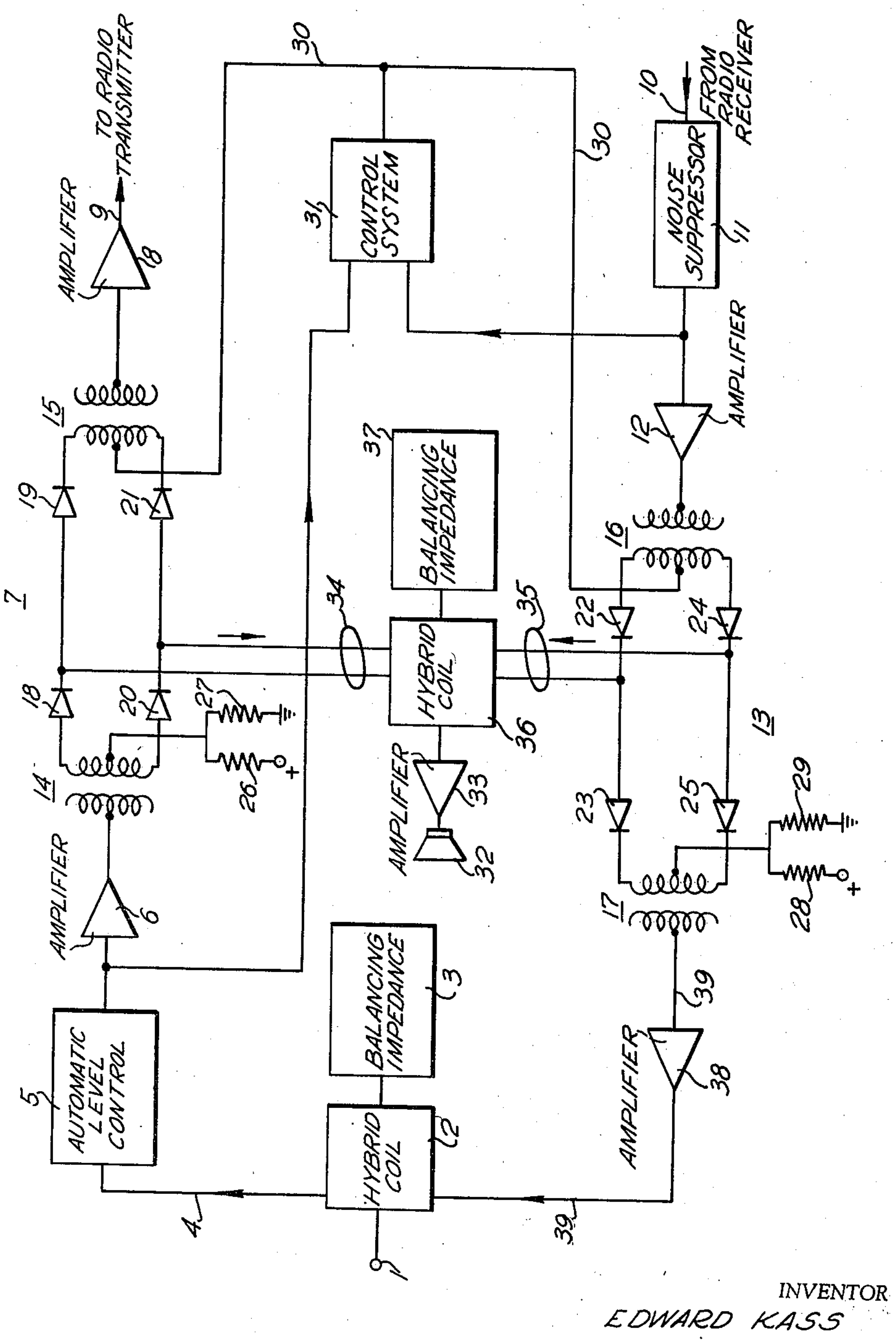
INVENTOR
EDWARD KASS
BY Fred M. Vogel
AGENT 2,820,108

HYBRID SYSTEM FOR USE IN RADIO-TELEPHONE LINKS COMPRISING A MONITORING CIRCUIT

Eduard Käss, Hilversum, Netherlands, assignor, by mesne assignments, to North American Philips Company, Inc., New York, N. Y., a corporation of Delaware Application June 7, 1954, Serial No. 434,924

Claims priority, application Netherlands June 30, 1953

2 Claims. (Cl. 179—170.2)

The present invention relates to a hybrid system. More particularly, the invention relates to a hybrid system for use in a radio-telephone link comprising a hybrid coil which has connected to it a transmitting branch comprising a static relay acting as a transmission suppressor and a receiving branch comprising a static relay acting as a reception suppressor, the suppressors being jointly and oppositely controlled by means of control voltage rectifiers connected to both branches.

In such hybrid systems it is known to use a monitoring circuit which through a hybrid coil and attenuators is constantly coupled to the transmitting and receiving branch, respectively. Thus, the said attenuators and the hybrid coil prevent the transmitting and receiving branch from being coupled in an inconvenient manner; in this event the attenuation caused by the attenuators must be compensated for by additional amplification.

According to the invention, in a hybrid system of the aforementioned type, in order to obviate the last-mentioned difficulty, the static relays acting as transmission and reception suppressor, respectively, comprise series branches each comprising two series-connected diodes and the branches of the monitoring circuit for the transmitting and receiving branch, respectively, are connected between the said series-connected diodes for the transmission and reception suppressor, respectively.

When the invention is used the blocking action of the suppressors included in the transmitting and receiving branch, respectively, is utilized to couple the monitoring circuit to the active branch of the hybrid system only and to prevent cross-talk between the transmitting and receiving branch by way of the monitoring circuit. In order to support relative de-coupling of the transmitting and receiving branch in this circuit-arrangement the branches of the monitoring circuit coupled to the transmission and reception suppressor, respectively, may be connected through a hybrid coil to a common reproducing device.

The invention will now be described with reference to the accompanying drawing, wherein the single figure is a schematic diagram of an embodiment of a hybrid system according to the invention.

In the figure, reference numeral 1 designates an input terminal of a hybrid system which may have a speaking and listening-in device, for example a handset, connected to it through a normal two-wire subscriber's line. The input terminal 1 is connected to a hybrid coil 2 provided with a balancing impedance 3. The hybrid coil 2 has a transmitting branch connected to it through the lead 4 and a receiving branch connected to it through the lead 39. Starting from the hybrid coil 2, the transmitting branch comprises in succession an automatic level control device 5, an amplifier 6, a static relay 7 acting as a transmission suppressor, and an output amplifier 8 having an output lead 9 which is connected to a radio transmitter (not shown). Starting from a radio receiver (not shown) the receiving branch of the hybrid system comprises in succession an input lead 10 to a noise suppressor

11, a separating amplifier 12, a reception suppressor 13 constituted by a static relay, and an amplifier 38 which is connected through the lead 39 to the hybrid coil 2.

Normally, the reception suppressor 13 included in the receiving branch of the hybrid system is conducting while the transmission suppressor 7 is blocked. Both the transmission and the reception suppressor are constituted by static relays which are coupled to the input and output leads through transformers 14, 15 and 16, 17, respectively. The two static relays comprise series branches each comprising two series-connected diodes, 18, 19 and 20, 21, respectively, in the transmission suppressor and 22, 23 and 24, 25, respectively, in the reception suppressor.

Through a center tap of the secondary winding of the input transformer 14 of the transmission suppressor the diodes 18, 19, 20 and 21 have a positive bias voltage supplied to them which normally blocks these diodes and is derived through a voltage divider comprising resistors 26 and 27 from a bias source (not shown). Through the center tap on the primary winding of output transformer 17, the diodes 22, 23, 24 and 25 of the reception suppressor 13 have a bias voltage supplied to them which normally maintains them in a conducting state. This center tap is connected to a voltage divider comprising resistors 28 and 29; this voltage divider may be connected to the same bias voltage supply as the above-mentioned voltage divider comprising resistors 26 and 27 for the transmission suppressor. The center tap on the primary winding of the output transformer 15 of the transmission suppressor is connected through a lead 30 to the center tap on the secondary winding of input transformer 16 of the reception suppressor. The lead 30 is connected to the output of a stage 31 which supplies a suppressor control voltage by which the suppressors are jointly controlled. Normally, the suppressors have a voltage impressed upon them through the lead 30 which is lower than the bias voltage derived from the voltage dividers associated with the respective suppressors. Thus, since the transmission suppressor diodes 18, 19, 20 and 21 and the reception suppressor diodes 22, 23, 24 and 25 are connected oppositely in relation to the bias voltages, the transmission suppressor will normally be blocked by the diodes concerned, while the reception suppressor diodes are normally conducting.

Control of the transmission and reception suppressors is effected by the stage 31 which comprises control voltage rectifiers (not shown) connected to both branches. As soon as the receiving branch of the hybrid system receives no speech signals, whereas speech signals are produced in the transmitting branch, both suppressors through the lead 30 have a voltage supplied to them which exceeds the voltage derived for each of the suppressors from the associated voltage dividers 26, 27 and 28, 29, respectively. This causes the reception suppressor 13 to be blocked and the transmission suppressor 7 to be made conducting. The manner in which by means of the stage 31 the suppressor control voltage is derived from the speech signals set up in the receiving and transmitting branch, respectively, of the hybrid system forms no part of the present invention and may be effected in several known ways. The one essential thing is, that the transmission and reception suppressors are jointly and oppositely controlled by means of control voltage rectifiers connected to the transmitting and receiving branch.

The hybrid system described comprises a monitoring circuit. This circuit comprises a reproducing device 32 which is common to the transmitting and receiving branches and is connected to a common amplifier 33 the input of which is connected to the transmitting branch through leads 34 and to the receiving branch through leads 35. The leads 34 for monitoring the transmitting branch are connected to the junction points of the diodes 18, 19 and 20, 21, respectively, included in the series branches of the transmission suppressor 7. The leads 35 for monitoring the receiving branch are connected to the junction points of the diodes 22, 23 and 24, 25, respectively, included in the reception suppressor 13. The leads 34 and 35 are coupled to the input of the monitoring amplifier 33 through a hybrid coil 36 including a balancing resistor 37.

As described hereinbefore, normally, in the hybrid system the reception suppressor 13 is conducting and the transmission suppressor 7 is blocked. Between the series branches comprising the diodes 22, 23 and 24, 25, respectively, of the reception suppressor received speech voltages may be set up which can be monitored through leads 35 and hybrid coil 36 by means of the reproducing device 32. In this case, the transmission suppressor is blocked, since the diodes 18, 19, 20 and 21 included in its series branches are blocked. Voltages which may be set up across the leads 34 through leads 35 from the reception suppressor are not able to exert any influence upon the transmitting branch, since the blocking resistance of diodes 19 and 21 is large in relation to the input impedance of the transmitting suppressor output transformer 15, only an insignificant fraction of the received signals being allowed to be set up across the output transformer 15.

A similar situation is obtained if the transmission suppressor 7 is conducting and the reception suppressor is blocked. In this event, the large blocking resistance of diodes 23 and 25 included in the reception suppressor prevents inconvenient cross-talk from the transmitting branch to the reception branch through the monitoring circuit. In actual fact, the monitoring circuit is thus invariably coupled only to that branch of the hybrid system the suppressor of which is conducting.

In order that the risk of cross-talk through the monitoring circuit may be reduced further, which may, for example, be of importance if the blocking resistance of the suppressor diodes should be comparatively low due to particular circumstances, the branches 34 and 35 of the monitoring circuit are coupled to the common reproducing device through a hybrid coil 36. As far as there need be no fear of an abnormally low blocking resistance of the suppressor diodes the use of such a hybrid coil supplying an additional cross-talk damping is not necessary.

In the hybrid system described crystal diodes having a blocking resistance of at least 1 megohm are preferably used as suppressor diodes. In this event a cross-talk damping through the monitoring circuit which is sufficient for all practical purposes of a value of, say, 60 decibels is obtainable.

What is claimed is:

1. A radio-telephone hybrid system comprising a hybrid coil, signal conducting means connected to said hybrid coil, a transmitting branch connected to said hybrid coil, a transmission suppressor connected in said transmitting branch, said transmission suppressor comprising series-connected sub-branches, two unidirectionally conducting elements connected in series in each sub-branch of said transmission suppressor, the last-mentioned unidirectionally conducting elements being connected to conduct a transmitted signal in the transmission direction in said transmission branch, means for maintaining the unidirectionally conducting elements of said transmission suppressor in normally non-conducting condition, a receiving branch connected to said hybrid coil, a reception suppressor connected in said receiving branch, said reception suppressor comprising series-connected sub-branches, two unidirectionally conducting elements connected in series in each sub-branch of said reception suppressor, the last-mentioned unidirectionally conducting elements being connected to conduct a received signal in the receiving direction in said receiving branch, means for maintaining the unidirectionally conducting elements of said reception suppressor in a normally conducting condition, control voltage rectifier means having the output thereof connected to said transmission suppressor and said reception suppressor for rendering said transmission suppressor conducting and for rendering said reception suppressor non-conducting upon the occurrence of an intelligence signal in said transmitting branch and for maintaining said suppressors in their normal conditions upon the occurrence of an intelligence signal in said receiving branch, and monitoring means connected between the two unidirectionally conducting elements of each sub-branch of said transmission suppressor and the two unidirectionally conducting elements of each sub-branch of said reception suppressor.

2. A radio-telephone hybrid system as claimed in claim 1, wherein said monitoring means comprises a second hybrid coil connected between the two unidirectionally conducting elements of each sub-branch of said transmission suppressor and the two unidirectionally conducting elements of each sub-branch of said reception suppressor, and reproducing means connected to said sub-branches through said second hybrid coil.

References Cited in the file of this patent

UNITED STATES PATENTS

| | | |
|---|---|---|
| 1,979,101 | Dudley | Oct. 30, 1934 |
| 2,131,578 | Bachelet et al. | Sept. 27, 1938 |
| 2,511,468 | Harrison | June 13, 1950 |